US006713933B2

(12) United States Patent
Martin

(10) Patent No.: US 6,713,933 B2
(45) Date of Patent: Mar. 30, 2004

(54) ELECTROMAGNETIC MOTOR

(76) Inventor: Robert M. Martin, P.O. Box 561, Alpine, CA (US) 91901

( * ) Notice: Subject to any disclaimer, the term of this patent is extended or adjusted under 35 U.S.C. 154(b) by 0 days.

(21) Appl. No.: 09/853,326

(22) Filed: May 10, 2001

(65) Prior Publication Data

US 2001/0030473 A1 Oct. 18, 2001

Related U.S. Application Data

(63) Continuation-in-part of application No. 09/500,938, filed on Apr. 17, 2000, now abandoned.

(51) Int. Cl.[7] ................................................ H02K 1/12
(52) U.S. Cl. ...................................... 310/254; 310/259
(58) Field of Search .............................. 310/164, 166, 310/179, 184, 185, 188, 194, 216, 218, 254, 259, 258, 49 R, 156.46, 224, 229, 230, 219, 231, 238, 152

(56) References Cited

U.S. PATENT DOCUMENTS

| 1,976,598 | A | * | 10/1934 | Boothby et al. ............. 318/831 |
| 2,164,915 | A | * | 7/1939 | Hall, Jr. ...................... 310/168 |
| 3,089,131 | A | * | 5/1963 | Morgan ....................... 340/319 |
| 3,124,733 | A | * | 3/1964 | Andrews ............... 310/156.46 |
| 3,544,868 | A | * | 12/1970 | Bates .......................... 318/138 |
| 3,781,876 | A | * | 12/1973 | McComb ............... 340/815.64 |
| 3,827,141 | A | * | 8/1974 | Hallberback .................. 29/596 |
| 4,942,345 | A | * | 7/1990 | Horst .......................... 318/254 |
| 5,245,233 | A | * | 9/1993 | Sudler .................... 310/156.12 |
| 5,570,503 | A | * | 11/1996 | Stokes .......................... 29/596 |
| 5,760,519 | A | * | 6/1998 | Fulton ......................... 310/254 |
| 5,814,965 | A | * | 9/1998 | Randall ....................... 318/701 |
| 6,140,729 | A | * | 10/2000 | Pollock et al. .............. 310/166 |

FOREIGN PATENT DOCUMENTS

| DE | 867657 | 2/1953 |
| EP | 0 553 866 A2 | 4/1993 |
| WO | WO 01/50578 A1 | 12/2001 |

* cited by examiner

*Primary Examiner*—Dang Le
(74) *Attorney, Agent, or Firm*—Gordon & Rees LLP

(57) ABSTRACT

An electromagnetic motor has an outer housing and a shaft rotatably mounted in the housing to extend along the central axis and out through one end of the housing. A plurality of electromagnets are mounted in the housing at spaced intervals around an annular ring centered on the central axis. An elongate rotor member of ferromagnetic material is secured to the shaft and projects in diametrically opposite directions radially outwardly from the shaft up to the annular ring of electromagnets. A power supply is connected to successive diametrically opposed pairs of electromagnets through a switching assembly such that the ends of the rotor are attracted to successive activated melectromagnets in the ring, thereby rotating the shaft.

9 Claims, 2 Drawing Sheets

ELECTROMAGNETIC MOTOR

CROSS-REFERENCES TO RELATED APPLICATIONS

This application is a Continuation-In-Part of my application Ser. No. 09/500,938 filed Apr. 17, 2000, now abandoned.

BACKGROUND OF THE INVENTION

The present invention relates generally to electromagnetic motors, and is particularly concerned with a motor for driving a vehicle or the like.

With increasing gasoline prices, there is increasing interest in electrically powered motors or engines. One problem with electrically powered automobile engines is the need to recharge the power source or battery at periodic intervals. U.S. Pat. No. 4,100,441 of Landry describes a magnetic transmission in which permanent magnets are mounted on an output shaft and drive rotor magnets are rotatably mounted around the periphery of the shaft in order to rotate the shaft. Each of the drive rotor permanent magnets is magnetically oriented for rotating the shaft at a speed proportional to the speed of rotation of the rotor magnets. This is a relatively complex structure which requires continuous rotation of the drive rotor permanent magnets.

SUMMARY OF THE INVENTION

It is an object of the present invention to provide a new and improved electromagnetic motor.

According to the present invention, an electromagnetic motor is provided which comprises an outer housing having a central axis, a shaft rotatably mounted in the housing to extend along the central axis and projecting out of one end of the housing, a plurality of electromagnets extending parallel to the shaft and mounted at spaced intervals in an annular ring around the shaft, an elongate rotor of ferromagnetic material having a central opening secured over the shaft and projecting in diametrically opposite directions radially outwardly from the shaft, the rotor having opposite ends located adjacent the ring of electromagnets, a power supply, and a switching assembly for connecting the power supply to successive pairs of diametrically opposed electromagnets in order to attract the opposite ends of the magnets to successive activated electromagnets in the ring, whereby the rotor and shaft are rotated in a predetermined direction.

The motor may include a speed control device between the power supply and electromagnets in order to control the speed of rotation of the shaft. In an exemplary embodiment, the switch assembly includes a plurality of electrical contacts equal in number to the number of electromagnets, the contacts being arranged in the housing in an annular ring centered on the central axis, and a contact wiper rotatably mounted at the central axis so as to successively contact diametrically opposite contacts in the ring, each opposing pair of contacts being electrically connected to a respective opposing pair of electromagnets, and the wiper being connected to the power supply. The amount of power provided to the electromagnets will control the speed of rotation of the shaft. The wiper may be mounted at one end of the shaft.

The electromagnetic motor of this invention is of compact design, using the electomagnets to pull the shaft and requiring no magnets to be mounted on the shaft itself. It has a periodic draw of electricity, rather than a continuous power draw, permitting the power supply to recharge more efficiently.

BRIEF DESCRIPTION OF THE DRAWINGS

The present invention will be better understood from the following detailed description of an exemplary embodiment of the invention, taken in conjunction with the accompanying drawings in which like reference numerals refer to like parts and in which:

FIG. 4 is a schematic illustration of a modified motor with an extra chamber for housing a generator or the like.

DETAILED DESCRIPTION OF THE DRAWINGS

Figure 1:
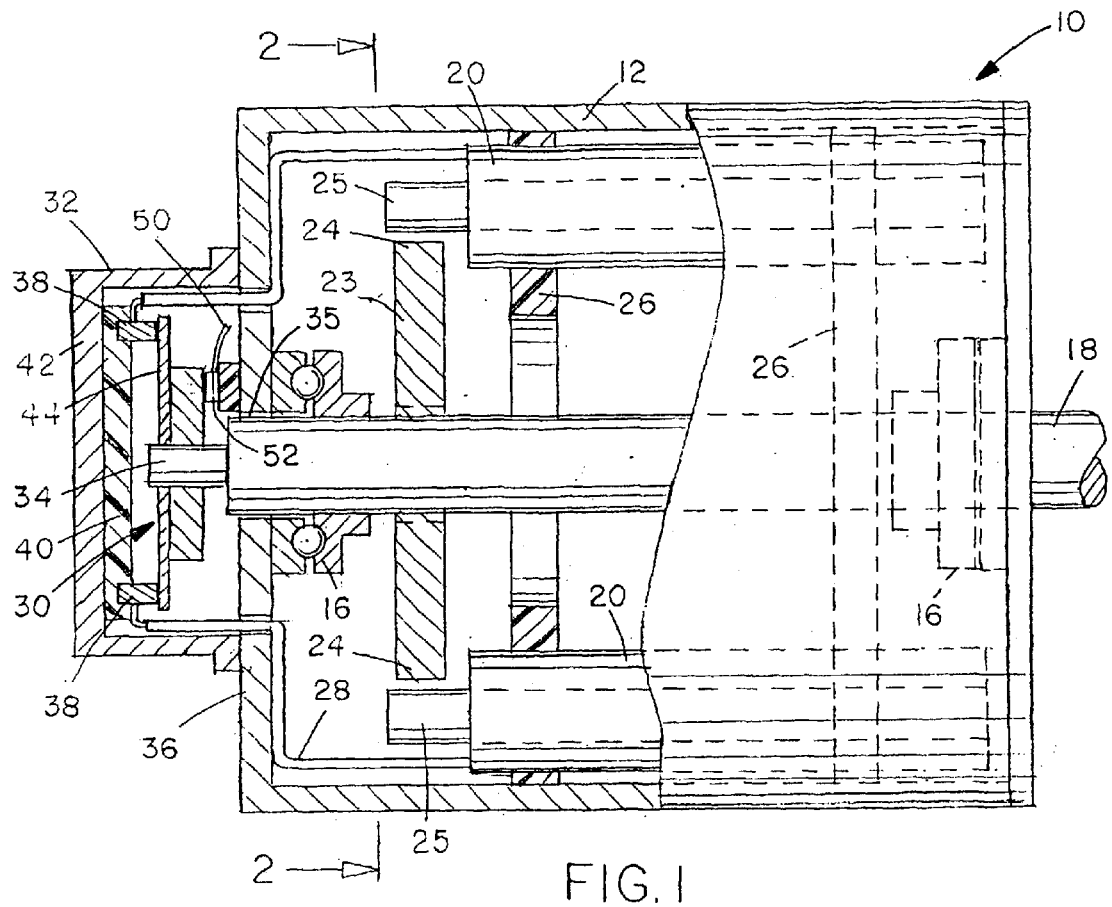
FIG. 1 is a side view of the electromagnetic motor according to an exemplary embodiment of the invention, partially cut away.
Figure 2:
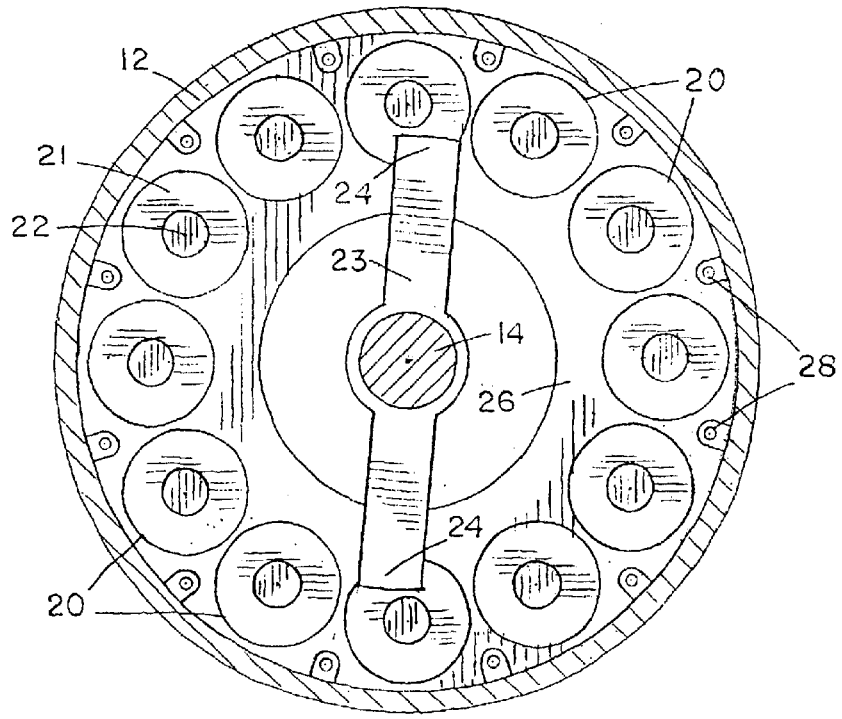
FIG. 2 is a sectional view taken on line 2—2 of FIG. 1.
Figure 3:
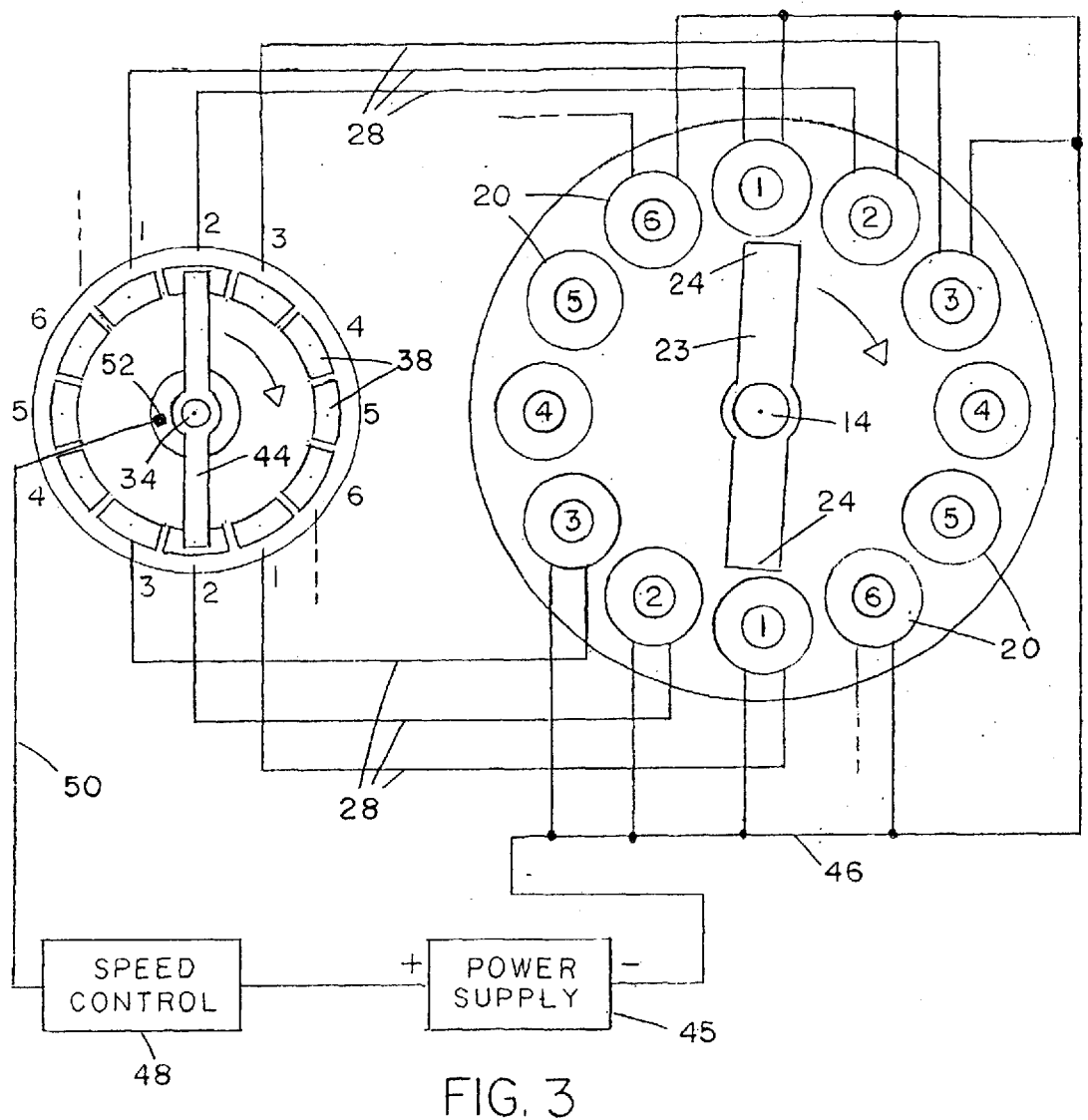
FIG. 3 is a wiring diagram of the motor.

FIGS. 1 to 3 illustrate an electromagnetic motor 10 according to an exemplary embodiment of the present invention. Motor 10 has an outer, generally cylindrical housing 12 with a shaft 14 extending along the central axis of the housing and rotatably mounted in the housing in bearings 16 at opposite ends of the housing. One end 18 of the shaft 14 projects out of the housing for suitable connection in a drive train of a vehicle engine, generator, equipment, truck, or the like. A plurality of electromagnets 20 are secured at spaced intervals around the inner wall of the housing, so as to extend in an annular ring around shaft 14, as best illustrated in FIG. 2. Each electromagnet comprises an outer wire winding 21 around a central, iron core rod 22.

An elongate member or rotor 23 secured to shaft 14 extends radially outwardly in opposite directions from the shaft, with opposite ends 24 of the shaft positioned adjacent the projecting ends 25 of the central iron rods 22 of two diametrically opposed electromagnets 20. The rotor 23 is of ferromagnetic material, or material which is attracted by magnets.

Each electromagnet 20 is supported by a pair of spaced support rings 26 with aligned openings through which the electromagnets extend. The electromagnets 20 are electrically connected by wiring 28 to a switch assembly 30 mounted at one end of the housing 12, as best illustrated in FIGS. 1 and 3. The switch assembly 30 is mounted in a reduced diameter enclosure or casing 32 projecting from the end of the housing 12, and a reduced diameter end portion 34 of the shaft 14 projects into the casing 32 through an opening 35 in the housing end wall 36. The switch assembly basically comprises a series of electrical commutator contacts 38 arranged in an annular ring around an insulating pad 40 on the inner side of the enclosure end wall 42, and a wiper rotor blade 44 of conductive material secured to the projecting end portion 34 of shaft 14 so as to contact two diametrically opposed contacts 38, as indicated in FIGS. 1 and 3.

Figure 4:
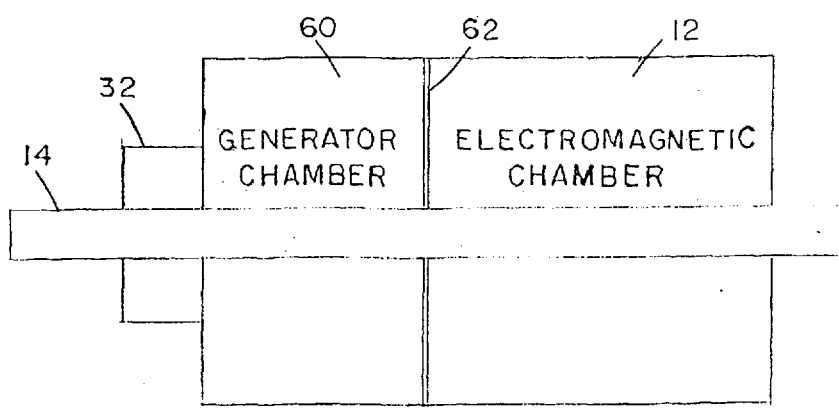

As best illustrated in FIG. 3, a suitable power supply 45 is connected via wires 46 to each of the electromagnets and via speed control unit 48, wiring 50 and contact 52 to the wiper rotor 44. Wiring 28 connects each opposing pair of contacts 38 to a corresponding opposing pair of electromagnets 20. Thus, the diametrically opposed contacts 38 labeled "1" in FIG. 3 are connected to the diametrically opposed electromagnets 20 also labeled "1", and so on up to the opposing pairs labeled "6". Although there are six opposing pairs of electromagnets and a corresponding six opposing pairs of contacts in the illustrated embodiment, it will be understood that a greater or lesser number of electromagnets and contacts may be provided in other embodiments. Power will be supplied at any time to the pair of electromagnets connected to the pair of commutator contacts which are connected to the power supply via wiper 44. The motor may be scaled up or down, depending on the application. Additionally, the housing 12 may be extended to leave more space to the left of rotor 23 for mounting a generator, as well as a power supply, if desired. This alternative is illustrated schematically in FIG. 4, where the housing is extended to provide a chamber 60 for a generator or the like, and end plate 62 separates generator chamber 60 from the chamber containing the electromagnets. Rotor shaft 14 extends through an opening in plate 62 and is rotatably supported in bearings in the end plate opening.

Operation of the electromagnetic motor will now be described in more detail. The electromagnets are arranged to be fired in sequence around the ring, from pair 1 up to pair 6, and then repeating the sequence so as to rotate the shaft 14 continuously. In the position illustrated in FIG. 3, the rotor 23 has opposite ends 24 adjacent the cores of the opposing pair of electromagnets labeled "1", while the wiper 44 is contacting the next pair of commutator contacts, labeled "2". Thus, electromagnets 1 are no longer activated, while electromagnets 2 have just been turned on. The opposite ends 24 of the blade 23 will therefore be attracted to the cores 25 of the next adjacent pair of electromagnets 2, and will therefore tend to rotate to the next pair as indicated by the arrow in FIG. 3. At the same time, this will move the wiper rotor 44 to the next pair of contacts 3, and the next pair of electromagnets 3 will be activated, turning the rotor 23 to the next position. Thus, the shaft 14 will be continuously rotated at a speed dependent on the magnitude of the power supplied to the electromagnets, while the draw of electricity will be intermittent. It can be seen in FIG. 3 that each pair of contacts 38 is connected to an angularly offset pair of electromagnets, so as to turn on the next sequential pair of electromagnets for any position of the rotor 23.

In an exemplary embodiment, the housing diameter was of the order of 16.5 inches, while the diameter of the main shaft 14 was 1.5 inches. The electromagnets 20 running parallel to the main shaft had a core length of the order of 12 inches and the iron or steel rods or cores had a diameter of around 1.5 inches, with a winding diameter of the order of 2.5 to 3 inches and a length of eleven inches such that an end portion of the core projects from the winding. The length of each side of the rotor 23 from the central axis of shaft 14 out to the end 24 was of the order of 4.5 to 6 inches. The total length of wiper rotor 44 was 4.5 inches.

By energizing opposing pairs of electromagnets in turn around the circumference of the electromagnet ring, more power and a more even pull on the shaft is provided. The speed of the motor can be controlled readily by any suitable speed control device for varying the power supply to the electromagnets, and the speed control unit may be linked to the accelerator pedal of an automobile, for example.

Although an exemplary embodiment of the invention has been described above by way of example only, it will be understood by those skilled in the field that modifications may be made to the disclosed embodiment without departing from the scope of the invention, which is defined by the appended claims.

I claim:

1. An electromagnetic motor, comprising:
    an outer housing having a central axis and opposite end walls;
    a shaft rotatably mounted in the housing to extend along the central axis and projecting out through one end wall of the housing;
    a plurality of electromagnets extending parallel to the shaft and mounted at spaced intervals around the entire circumference of an annular ring centered on the central axis and spaced radially outwardly from the shaft, each electromagnet being located diametrically opposite to another electromagnet in the ring, whereby the electro-magnets are arranged in diametrically opposed pairs;
    a single, elongate, linear rotor member of ferromagnetic material secured to the shaft and projecting radially outwardly from the shaft in two opposite directions to extend up to the annular ring of electromagnets, the rotor having only two opposite ends located adjacent the ring of electromagnets, whereby the rotor ends are located adjacent only two diametrically opposed electromagnets at any time as the rotor rotates;
    a power supply;
    a switching assembly for connecting the power supply to successive pairs of diametrically opposed electromagnets in order to activate each pair of diametrically opposed electromagnets in sequence around the ring, the switching assembly connecting power to only one pair of diametrically opposed electromagnets at any one time, such that the opposite ends of the rotor are attracted to successive activated opposed pairs of electromagnets in turn around the ring, whereby the rotor and shaft are rotated in a predetermined direction; and
    the switch assembly comprising a plurality of electrical contacts equal in number to the number of electromagnets, the contacts being arranged in the housing in an annular ring centered on the central axis, the contacts being positioned in diametrically opposed pairs, and a linear, elongate contact wiper secured to the shaft and extending radially in opposite directions from the shaft so as to successively contact each pair of diametrically opposed contracts around the ring in sequence as the shaft rotates, each opposing pair of contacts being electrically connected to a respective opposing pair of electromagnets in a respective circuit separate form all other circuits in the switch assembly, and the wiper being connected to the power supply, whereby diametrically opposed pairs of electromagnets are activated in sequence around the ring in order to attract the rotor member to the next successive adjacent opposed pair of electromagnets in turn around the ring.

2. The motor as claimed in claim 1, including a speed control device between the power supply and electromagnets in order to control the speed of rotation of the shaft.

3. The motor as claimed in claim 1, wherein the outer housing has an inner cylindrical wall and the electromagnets are arranged in said annular ring around the inner wall of the housing.

4. The motor as claimed in claim 1, wherein each electromagnet has a metal core and an outer winding, the metal core having one end projecting out of the winding, and the opposite ends of the rotor are positioned to move in a circular path extending adjacent the projecting ends of the electromagnet cores.

5. The apparatus as claimed in claim 1, including a switch housing enclosing the switching assembly, the switch housing being mounted at one end of said outer housing, said one end having a central opening, and said shaft extending through said central opening into said switch housing for connection to said contact wiper.

6. The apparatus as claimed in claim 1, wherein the switch assembly is mounted at a location spaced axially from said electromagnets, and each pair of diametrically opposed contacts is at a corresponding angular position to a corresponding pair of diametrically opposed electromagnets.

7. The apparatus as claimed in claimed in claim 6, wherein each pair of diametrically opposed contacts is electrically connected to the next adjacent pair of diametrically opposed electromagnets in the sequence around the ring to the corresponding pair of diametrically opposed electromagnets, whereby contact of the contact wiper with a respective pair of diametrically opposed contacts connects power to said next pair of diametrically opposed electromagnets such that the shaft and rotor rotate to position the rotor at said next pair of diametrically opposed electromagnets and the wiper member is rotated to the next successive pair of diametrically opposed contacts.

8. The apparatus as claimed in claim 1, wherein the switching assembly is arranged to connect power to successive pairs of aligned electromagnets intermittently, such that power is only drawn when the contact wiper contacts a pair of diametrically opposed contacts and is not drawn as the contact wiper rotates between two adjacent pairs of diametrically opposed contacts.

9. The motor as claimed in claim 1, wherein the electromagnets extend from a first of the housing end walls and terminate short of a second end wall to leave a chamber between the electromagnets and second end wall.

* * * * *